United States Patent [19]

Iorfida

[11] Patent Number: 5,371,656
[45] Date of Patent: Dec. 6, 1994

[54] APPARATUS FOR DISPLAYING AN ILLUMINATED IMAGE AND METHOD THEREFOR

[76] Inventor: Paul Iorfida, 8300 Jadwin St., Cinti, Ohio 45216

[21] Appl. No.: 178,791

[22] Filed: Jan. 7, 1994

[51] Int. Cl.⁵ ............................................. F21V 8/00
[52] U.S. Cl. .................... 362/31; 40/152.2; 362/128
[58] Field of Search ............. 362/128, 135, 145, 31, 362/32; 40/152.2

[56] References Cited

U.S. PATENT DOCUMENTS

| 2,500,511 | 3/1950 | Bonnet | 40/152.2 |
|---|---|---|---|
| 2,522,812 | 9/1950 | Bonnet | 40/152.2 |
| 2,523,290 | 9/1950 | Gardner | 40/152.2 |
| 2,716,918 | 9/1955 | Miles . | |
| 2,806,939 | 9/1957 | Montebello | 40/152.2 |
| 3,497,686 | 2/1970 | Young | 362/31 |
| 3,803,737 | 4/1974 | Beckett . | |
| 3,968,584 | 7/1976 | Kingston | 362/31 |
| 4,059,916 | 11/1977 | Tachihara et al. | 40/152.2 |
| 4,674,211 | 6/1987 | Pratt | 40/152.2 |
| 4,819,353 | 4/1989 | Glucksman . | |
| 4,922,384 | 5/1990 | Torreence . | |
| 4,942,685 | 7/1990 | Lin . | |
| 5,124,890 | 6/1992 | Choi . | |
| 5,211,464 | 5/1993 | Bohmer | 362/31 |
| 5,262,928 | 11/1993 | Kashima | 362/31 |
| 5,289,351 | 2/1994 | Kashima | 362/31 |

Primary Examiner—Ira S. Lazarus
Assistant Examiner—Daniel J. O'Connor
Attorney, Agent, or Firm—Harry M. Weiss

[57] ABSTRACT

A transparent acrylic sheet carries a mirrored coating on its back surface. The sheet has a ground front surface that carries a cibachrome image transparency. Light passes through an edge of the sheet to the ground surface where it is diffused. The diffused light illuminates a back surface of the transparency, thereby providing a display of an illuminated image to an observer who views a front surface of the transparency.

11 Claims, 1 Drawing Sheet

APPARATUS FOR DISPLAYING AN ILLUMINATED IMAGE AND METHOD THEREFOR

BACKGROUND OF THE INVENTION

1. Field of Invention

This invention is in the field of pictorial displays and methods therefor and, more particularly, is an apparatus and a method for displaying an illuminated image.

2. Description of the Prior Art

A display of an illuminated image is often desirable because illumination makes features of the image discernable when there is little ambient light. Additionally, the illumination attracts the attention of those in its vicinity.

When the image is carried in a medium such as an image transparency, the back of the transparency is usually illuminated to cause the illuminated image to appear to an observer located in front of the transparency. One way of illuminating the transparency includes providing a light box from which one or more fluorescent bulbs transmit light through a translucent material to the back of the transparency.

Another way of illuminating the transparency includes the use of a plurality of incandescent bulbs and mirrors at the back of the transparency. Alternatively, light from an incandescent bulb is transmitted directly to the front of the transparency.

Although apparatus for providing the above-described illumination is suitable for displaying an illuminated image of a size used for a wall hanging, they are too large for displaying an illuminated image of a reduced size that is suitable for placement on a desk, for example. Heretofore there has not been apparatus display for displaying the illuminated image of the reduced size.

SUMMARY OF THE INVENTION

An object of the present invention is a transmission of diffused light to an image transparency and method therefor.

Another object of the present invention is a transmission of diffused light to an image transparency of reduced size and a method therefor.

BRIEF DESCRIPTION OF THE PREFERRED EMBODIMENT

According to the present invention, a sheet of an optical material has a mirrored back surface and a ground front surface. The front surface of the sheet is bonded to the back surface of an image transparency. Light transmitted through an edge of the sheet is diffused by the ground surface. The diffused light is transmitted to the back surface of the transparency to provide an illuminated image to an observer located in front of the transparency.

The present invention provides apparatus for displaying an illuminated image of a size suitable for a wall hanging or of a size suitable for placement on a desk.

Other objects, features and advantages of the invention will be apparent from the following description of the preferred embodiment as illustrated in the accompanying drawing.

DESCRIPTION OF THE PREFERRED EMBODIMENT

Figure 1:
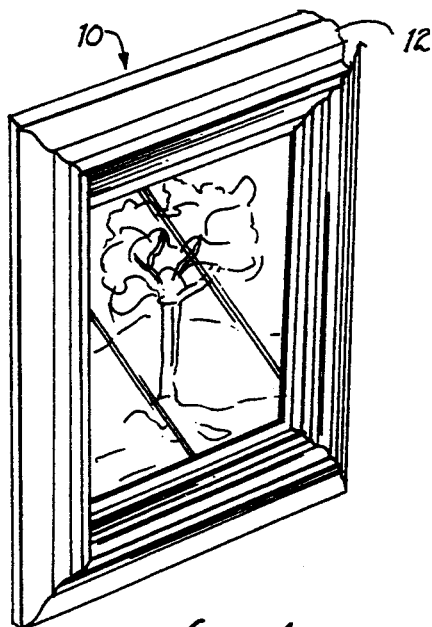
FIG. 1 is a perspective view of an image transparency within a frame.
Figure 2:
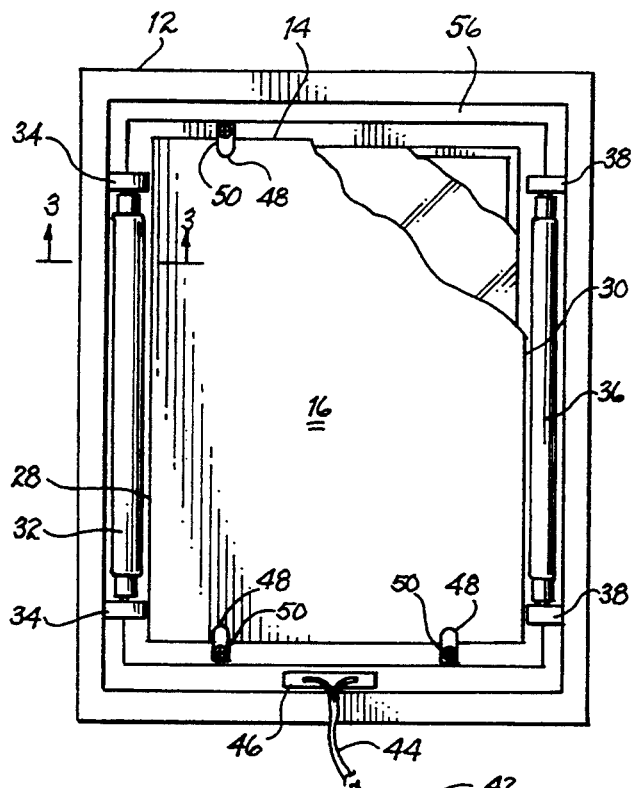
FIG. 2 is a rear view, with parts broken away, of the frame of FIG. 1 and its contents.
Figure 3:
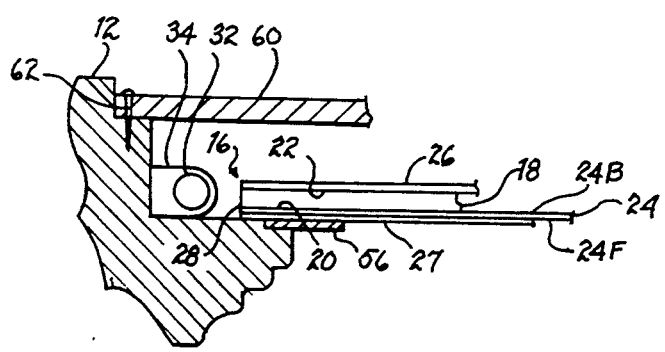
FIG. 3 is a partial section of FIG. 2 taken along the line 3—3.

As shown in FIGS. 1-3, a display 10 includes a frame 12 having a recess 14 (FIG. 2) wherein a laminate 16 is maintained as explained hereinafter.

Laminate 16 is comprised of a transparent acrylic sheet 18 that has a ground front surface 20, a polished back surface 22 and polished side edges 28, 30. Surfaces 20, 22 carry an image transparency 24 and a mirrored coating 26, respectively. Transparency 24 is of a type that is marketed under the trade designations of cibachrome and duratrans. Although sheet 18 may alternatively be made from glass, acrylic has light transmission characteristics that are superior to those of most types of glass.

To form laminate 16, a back surface 24B of transparency 24 is bonded to surface 20 by any one of a plethora of well known transparent photographic adhesives. Additionally, a front surface 24F of transparency 24 is coated with a transparent photographic laminate coating to protect transparency 24 against dust. Photographic laminate coatings are well known to those skilled in the art.

Adjacent to edge 28 is a cylindrical fluorescent lamp 32 that has respective ends removably mounted within fixtures 34. Fixtures 34 are connected to frame 12 at respective locations that are selected to cause the axis of lamp 32 to be substantially parallel to edge 28. Because edge 28 is adjacent to lamp 32, emitted light therefrom passes through edge 28 into sheet 18.

Similarly, adjacent to edge 30 is a cylindrical fluorescent lamp 36 that has respective ends removably mounted within fixtures 38. Fixtures 38 are connected to frame 12 at respective locations that are selected to cause the axis of lamp 36 to be substantially parallel to edge 30. Because edge 30 is adjacent to lamp 36, emitted light therefrom passes through edge 30 into sheet 18.

The light in sheet 18 is either directly transmitted to surface 20 or reflected from coating 26 to surface 20. Because surface 20 is ground, diffused light is emitted therefrom. The diffused light illuminates surface 24B, thereby providing the display of the illuminated image to an observer who views surface 24F through surface 27.

Lamps 32, 36 receive electrical power via a connection of wires 40 (FIG. 2) to an electrical outlet (not shown). Wires 40 are connected through a switch 42 and wires 44 to a transformer 46. Switch 42 is operable to cause the electrical power to be provided to transformer 46. Wires from transformer 46 are connected through wires (not shown) to fixtures 34, 38. Wiring of fluorescent lamps is well known to those skilled in the illumination art.

Laminate 16 is maintained within recess 14 by a plurality of spring clips 48 that are fastened by screws 50 to frame 12. Clips 48 bear against coating 26 to cause laminate 16 to abut a matting 56 which is described hereinafter.

A front surface 27 of laminate 16 is bordered by matting 56. Frame 12 has a notch wherein a portion of matting 56 is retained. The use of a matting with a framed display is well known to those skilled in the photographic art.

Recess 14 is covered by a back panel 60 (FIG. 3) that has edges that fit within a notch 62 that extends along the perimeter of recess 14. Panel 60 is fastened to frame 12 by a plurality of screws 62. Panel 60 prevents light from lamps 32, 36 from passing outside of recess 14 through the back of frame 12.

Although the invention has been particularly shown and described with reference to a preferred embodiment thereof, it will be understood by those skilled in the art that changes in form and detail may be made therein without departing from the spirit and scope of the invention.

I claim:

1. Apparatus for displaying an illuminated image in a frame, comprising, in combination:
   a transparent optical material that has a polished back surface, polished edges and a ground front surface;
   a mirrored coating that is carried on and in contact with said polished back surface of said transparent optical material;
   an image transparency that has a back surface bonded to said ground surface; and
   means for passing light through said edges for reflection from said mirrored coating through said ground surface and said image transparency in contact therewith to provide a lit display of said transparency.

2. The apparatus of claim 1 wherein said optical material is a sheet of acrylic.

3. The apparatus of claim 1 additionally comprising a photographic laminate coating that covers the front surface of said transparency, said mirrored coated acrylic and said coated transparency forming a laminate.

4. The apparatus of claim 1 wherein said means comprises a light source adjacent one of said edges.

5. The apparatus of claim 4 wherein said light source is a fluorescent lamp connected to said frame.

6. The apparatus of claim 5 wherein said lamp is of a generally cylindrical shape with the axis of said lamp parallel to said edge.

7. The apparatus of claim 1 wherein said transparency is a cibachrome image transparency.

8. The apparatus of claim 1 wherein said transparency is a duratrans image transparency.

9. In the method of displaying an illuminated image, the steps of:
   carrying a mirrored coating on a polished surface of an optical material;
   carrying a photographic transparency on a ground surface of said optical material; and
   transmitting light through an edge of said optical material for reflection from said mirrored coating through said ground surface and said photographic transparency in contact therewith to provide a lit display of said transparency.

10. In the method of claim 9, the additional step of coating the front surface of said transparency with a laminate coating.

11. In the method of claim 9 wherein the step of carrying said transparency includes bonding a back surface of said transparency to said ground surface.

* * * * *